(12) United States Patent
Stout et al.

(10) Patent No.: US 8,353,995 B2
(45) Date of Patent: Jan. 15, 2013

(54) AUTOMOBILE PANEL REPAIR LAMINATE

(75) Inventors: George M. Stout, Maplewood, MN (US); George J. Clements, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 886 days.

(21) Appl. No.: 11/182,912

(22) Filed: Jul. 15, 2005

(65) Prior Publication Data

US 2007/0014984 A1    Jan. 18, 2007

(51) Int. Cl.
 *B29C 73/00* (2006.01)
 *B29C 73/04* (2006.01)
 *B32B 43/00* (2006.01)

(52) U.S. Cl. ......................................... 156/94
(58) Field of Classification Search ............... 156/60, 156/94, 106
 See application file for complete search history.

(56) References Cited

U.S. PATENT DOCUMENTS

| | | | |
|---|---|---|---|
| 3,470,048 A | 9/1969 | Jones | |
| 3,850,718 A | 11/1974 | Trapani | |
| 4,133,913 A | 1/1979 | Moore | |
| 4,410,011 A * | 10/1983 | Andra et al. | 138/118.1 |
| 4,415,615 A | 11/1983 | Esmay et al. | |
| 4,497,755 A | 2/1985 | Korsyn | |
| 4,588,626 A * | 5/1986 | Cologna et al. | 428/63 |
| 4,707,391 A | 11/1987 | Hoffmann, Sr. | |
| 4,732,633 A * | 3/1988 | Pokorny | 156/94 |
| 4,855,182 A | 8/1989 | Ondrejas et al. | |
| 4,902,557 A * | 2/1990 | Rohrbacher | 428/215 |
| 4,959,261 A | 9/1990 | McCullough, Jr. et al. | |
| 5,075,149 A | 12/1991 | Owens et al. | |
| 5,450,235 A | 9/1995 | Smith et al. | |
| 5,620,768 A | 4/1997 | Hoffmann, Sr. | |
| 5,643,648 A | 7/1997 | Kobe et al. | |
| 5,654,387 A | 8/1997 | Bennett et al. | |
| 5,681,868 A * | 10/1997 | Waldenberger et al. | 521/126 |
| 5,705,006 A | 1/1998 | Roudebush et al. | |
| 5,807,628 A | 9/1998 | Mnich et al. | |
| 6,042,669 A * | 3/2000 | Craig | 156/94 |
| 6,103,152 A | 8/2000 | Gehlsen et al. | |
| 6,117,531 A | 9/2000 | Schacht et al. | |
| 6,250,587 B1 * | 6/2001 | Schramm et al. | 244/134 R |
| 6,287,685 B1 | 9/2001 | Janssen et al. | |
| 6,551,425 B2 | 4/2003 | Sylvester | |
| 6,586,483 B2 | 7/2003 | Kolb et al. | |
| 6,630,531 B1 | 10/2003 | Khandpur et al. | |
| 6,777,080 B2 | 8/2004 | Khandpur et al. | |
| 6,864,322 B2 * | 3/2005 | Gehlsen et al. | 525/227 |
| 2003/0113534 A1 | 6/2003 | Poisson | |

FOREIGN PATENT DOCUMENTS

| | | | |
|---|---|---|---|
| EP | 0 384 598 B1 | | 8/1993 |
| JP | 58-87171 | * | 5/1983 |
| JP | 2002-47809 | | 2/2002 |
| WO | WO 95/06691 | | 3/1995 |
| WO | WO97/04947 | | 2/1997 |
| WO | WO 97/32941 | | 9/1997 |
| WO | WO00/30844 | | 6/2000 |
| ZA | 8600959 | * | 8/1986 |

* cited by examiner

*Primary Examiner* — Justin Fischer

(57) ABSTRACT

Automobile panel repair laminates include a pressure sensitive adhesive bonded to a support backing. The support backing may be constructed of various materials such as plastically deformable polymeric materials including thermoplastic or thermoset materials and may have various thicknesses depending upon the desired conformability and rigidity necessary for the repair. The support backing may be bonded to the pressure sensitive adhesive by applying adhesion promoters such as solvents. The repair laminate is applied to a back or non-aesthetic side of the automobile panel, and the front side is repaired using standard techniques for filling and finishing.

5 Claims, 1 Drawing Sheet

AUTOMOBILE PANEL REPAIR LAMINATE

TECHNICAL FIELD

The present invention is related to repair work for damaged automobile parts. More particularly, the present invention is related to the repair laminates that are used to repair the damaged area of the automobile part.

BACKGROUND

Virtually any panel of an automobile is subject to being damaged and requiring repair. Automobiles include various interior and exterior panels that may be damaged due to a collision, misuse, and the like. For example, automobile bumpers are very vulnerable and are often subject to collision damage including scrapes, nicks, punctures, tears, etc.

It is often less expensive to repair the damaged automobile panel than to replace it. This is especially true for light damage to the automobile panel, such as a scrape, that only affects the front side such that only the front side must be treated. However, for more severe damage such as a puncture where both sides must be treated, the repair may become a time consuming process. Furthermore, such severe damage affects the structural integrity of the automobile panel, and the resulting repair either may not adequately restore the structural integrity or may result in an automobile panel that lacks the flexibility that it had prior to the damage.

SUMMARY

Embodiments of the present invention address these issues and others by providing an automobile repair laminate that is applied to the back or non-aesthetic side of the automobile panel to allow for a relatively fast repair to the back side while providing energy absorption and conformability characteristics necessary to restore the structural integrity for the panel.

One embodiment is a repair laminate that includes a pressure sensitive adhesive, a plastically deformable polymeric support backing bonded to the pressure sensitive adhesive, and the support backing has a thickness of at least 0.75 millimeters.

Another embodiment is a method of creating a repair laminate that involves providing a pressure sensitive adhesive. A plastically deformable polymeric support backing has a thickness of at least 0.75 millimeters, and the pressure sensitive adhesive is bonded to the support backing.

Another embodiment is a method of repairing an automobile panel having a front side, a back side, and a damaged area. A repair laminate is applied to the back side of the automobile panel at the damaged area to reinforce the damaged area, and the repair laminate includes a pressure sensitive adhesive bonded to a support backing. The repair laminate is applied to the back side by bonding the pressure sensitive adhesive to the back side. After applying the repair laminate, the front side is cosmetically repaired.

DETAILED DESCRIPTION

Figure 1:
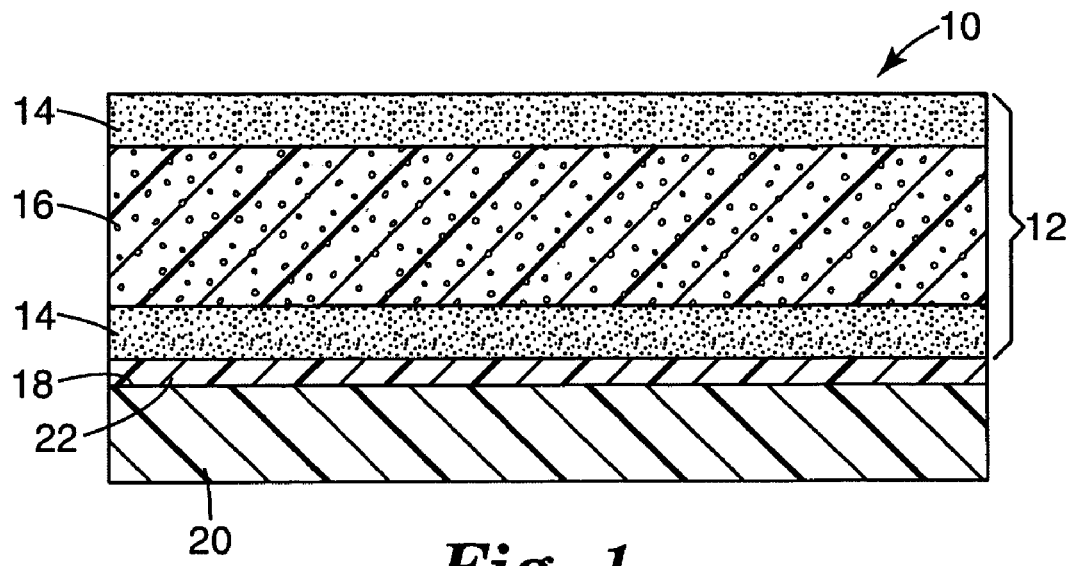
FIG. 1 shows a cross-sectional view revealing various layers of one embodiment of an automobile panel repair laminate.

FIG. 1 illustrates an automobile panel repair laminate 10 utilized in an embodiment of the present invention. The automobile panel repair laminate 10 has a Pressure Sensitive Adhesive (PSA) material 12 comprising adhesive layers 14 on opposing sides of a central core 16 of a rubber or polymeric material. In an embodiment, the core material is in the form of a polymeric foam. In other embodiments, the PSA material may be completely comprised of an adhesive material such that a separate layer of adhesive would not be necessary (not illustrated). The PSA material 12 is included to provide a material that conforms to an automobile panel and provides energy absorption that provides for impact resistance. Details regarding variations of the PSA in various embodiments of the automobile panel repair laminate are discussed in more detail below.

The embodiment of the automobile panel repair laminate 10 shown in FIG. 1 also includes a support backing 20 that is bonded to the PSA material 12. A surface 18 of the support backing 20 comprises an adhesion promoter layer 22 that completes the bond between the support backing 20 and the PSA material 12. The plastically deformable support backing 20 conforms in conjunction with the PSA material 12 yet provides the structural rigidity necessary to allow the automobile panel to be filled from the opposite side without collapsing away from the panel. Details regarding variations of the support backing 20 in various embodiments of the automobile panel repair laminate are also discussed in more detail below.

Figure 2:
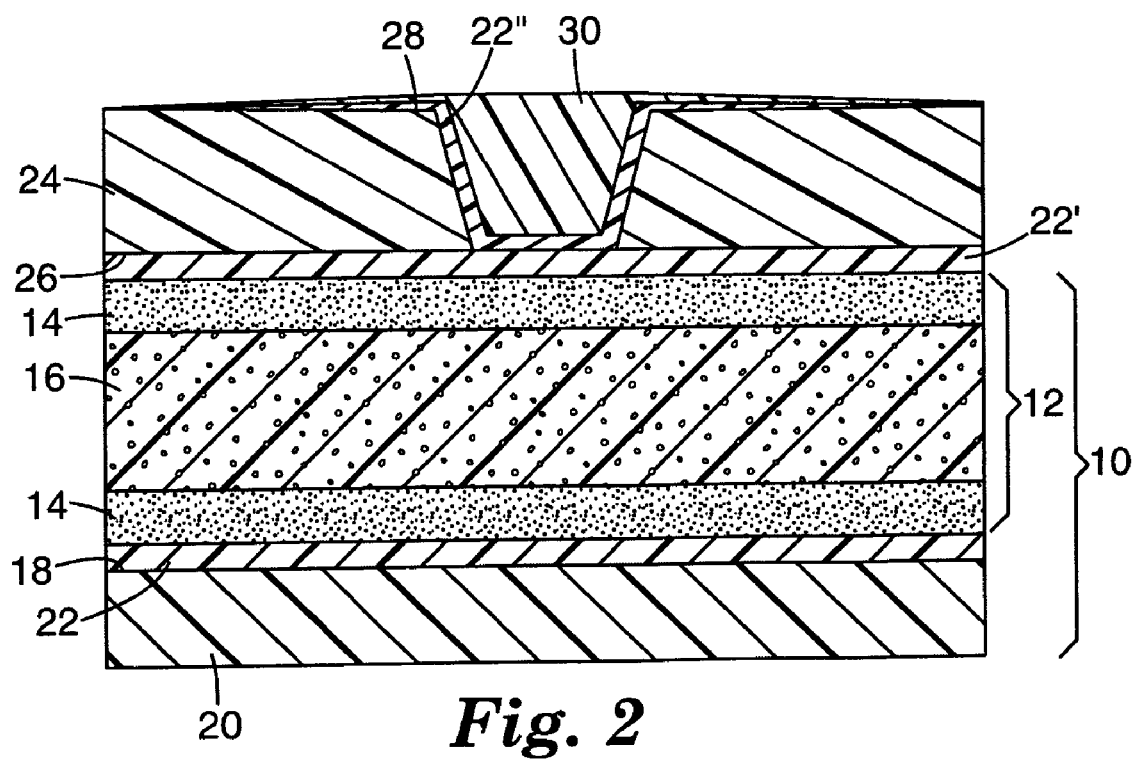
FIG. 2 shows a cross-sectional view of a repaired automobile panel revealing the various layers of the repair including the layers of the automobile panel repair laminate.

FIG. 2 illustrates a repaired automobile panel 24 according to an embodiment of the present invention. As used herein, an automobile panel includes any panel of an automobile including exterior panels such as doors, bumpers, fenders, and the like as well as interior panels such as the dashboard, door panels, center consoles, and the like. The back surface 26 of the automobile panel 24 has applied to it an adhesion promoter layer 22' that creates a bond with the adhesive layer 14 of the automobile panel repair laminate 10. The damaged front surface 28 of the automobile panel 24 has applied to it an adhesion promoter layer 22" and an adhesive filler material 30, sanded flush with the automobile panel surface 28. The adhesion promoter layer 22" is applied to aid in bonding to the filler material 30, and the filler material 30 is then applied to the damaged location of the automobile panel 24 to fill-in any cracks or punctures that are present. It will be appreciated that the adhesion promoter layers 22, 22' and 22" may be the same or different.

To repair the automobile panel 24, initially, the back surface 26 is prepared by cleaning the surface 26 with a conventional solvent. The front surfaced 28 may then be dished out as is known in the art in preparation for receiving filler material 30. The exposed PSA layer 14 of the repair laminate is then applied to the back surface 26. Then, the damaged area of the front surface 28 may be cosmetically repaired by applying the adhesive promoter 22", placing the filler material 30 into the damaged area, and then performing any finishing steps including sanding, applying primer, and painting. The automobile panel 24 retains its structural rigidity and bond to the rear surface 26 during the cosmetic repair steps, rather than collapsing away from the panel 24.

An automobile panel repair laminate 10 may be provided in a variety formats for use with in methods of repairing automobile panels. In one embodiment, the PSA material 12 may have a thickness of between 0.125 and 1.25 millimeters (mm), and typically around 0.40 and 0.64 mm thick. The support backing of the embodiment may have a thickness between 0.75 and 5 mm, and typically between 1 and 2 mm. The automobile panel repair laminate 10 may be provided in a variety of shapes and sizes, as appropriate for the application. In one or more embodiments, the automobile panel repair laminate 10 may have a size selected such that the laminate 10 extends at least 50 mm beyond the damaged area of the automobile panel 24 where the filler 30 is located. In certain embodiments, the adhesive surface 14 of automobile panel repair laminate 10 may be covered by a release liner (not shown) until ready for use.

The PSA material utilized in various embodiments of the present invention may be chosen from a variety of aggressively bonding PSAs. By their nature, PSAs are inherently tacky in that they are instantaneously bonding immediately upon the application of pressure without receiving any other treatment. In an embodiment, the pressure sensitive adhesive is in the form of an acrylic foam tape. Acrylic foam tapes are commercially available under trade designations "VHB" and "Acrylic Foam Tape" from 3M Company, St. Paul, Minn. In a further embodiment, a polyurethane foam tape may be used. Polyurethane foam tapes are commercially available under the trade designations "2845 Urethane Foam Tape" "Thermalbond V2100" and "T-Bond II" from the Saint-Gobain Performance Plastics, Grandville, N.Y. The pressure sensitive adhesive material of the present invention advantageously does not need to be cured with heat or radiation in order to form a bond.

Examples of suitable pressure sensitive adhesive materials are described in U.S. Pat. No. 6,103,152 (Gehlsen et al.), U.S. Pat. No. 6,630,531 (Khandpur et al.), and U.S. Pat. No. 6,586,483 (Kolb et al.), the disclosures of each incorporated by reference herein. A further example of a pressure sensitive adhesive is described in U.S. Pat. No. 6,777,080 (Khandpur et al.), the entire content of which is also incorporated by reference herein.

In an embodiment, the PSA material is an acrylic polymer foam article as described in U.S. Pat. No. 6,103,152. The foam includes a plurality of microspheres at least one of which is an expandable polymeric microsphere.

As used herein, a "polymer foam" refers to an article that includes a polymer matrix in which the density of the article is less than the density of the polymer matrix alone. In one or more embodiments, the polymeric foam material may have a substantially smooth surface, which facilitates seamless adhesion to a substrate.

A "substantially smooth" surface refers to a surface having an Ra value less than about 75 micrometers, as measured by laser triangulation profilometry. In one embodiment, the surface has an Ra value less than about 50 micrometers, in a further embodiment, the surface has an Ra value less than about 25 micrometers. The surface of certain embodiments may also be characterized by the substantial absence of visually observable macroscopic defects such as wrinkles, corrugations and creases. In addition, the surface of certain embodiments may be sufficiently smooth such that it exhibits adequate contact and, thereby, adhesion to a substrate of interest.

An "expandable polymeric microsphere" is a microsphere that includes a polymer shell and a core material in the form of a gas, liquid, or combination thereof, that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The polymer foam PSA material may be constructed in one of at least two different ways. The polymer foam itself may be an adhesive, or the polymer foam material may include one or more separate adhesive compositions bonded to the foam, e.g., in the form of a continuous layer or discrete structures (e.g., stripes, rods, filament, etc.), in which case the foam itself need not be an adhesive.

The polymer foam PSA of certain embodiments may be substantially free of urethane crosslinks and urea crosslinks, thus eliminating the need for isocyanates in the composition. An example of a material suitable for making the polymer foam is an acrylic polymer or copolymer. In some cases, e.g., where high cohesive strength and/or high modulus is needed, the foam may be crosslinked.

The polymer foam of certain embodiments may include a plurality of expandable polymeric microspheres. The foam may also include one or more non-expandable microspheres, which may be polymeric or non-polymeric microspheres (e.g., glass microspheres). Examples of expandable polymeric microspheres in the polymer foam material of one or more embodiments may include those in which the shell is essentially free of vinylidene chloride units. Core materials of various embodiments may include materials other than air that expand upon heating.

The foam of various embodiments may contain agents in addition to microspheres. Examples of suitable agents include those selected from the group consisting of tackifiers, plasticizers, pigments, dyes, solid fillers, and combinations thereof. The foam may also include gas-filled voids in the polymer matrix. Such voids typically are formed by including a blowing agent in the polymer matrix material and then activating the blowing agent, e.g., by exposing the polymer matrix material to heat or radiation.

It may be desirable for the foam of certain embodiments to comprise a substantially uncrosslinked or thermoplastic polymeric matrix material. It can also be desirable for the matrix polymer of the foam of certain embodiments to exhibit some degree of crosslinking. One potential advantage to such crosslinking is that the foam will likely exhibit improved mechanical properties (e.g., increase cohesive strength) compared to the same foam with less or no crosslinking.

In an embodiment, the PSA material comprises a polymer foam that includes: (a) a plurality of microspheres, at least one of which is an expandable polymeric microsphere (as defined above), and (b) a polymer matrix that is substantially free of urethane crosslinks and urea crosslinks. The matrix includes a blend of two or more polymers in which at least one of the polymers in the blend is a pressure sensitive adhesive polymer (i.e., a polymer that is inherently pressure sensitive, as opposed to a polymer which must be combined with a tackifier in order to form a pressure sensitive composition) and at least one of the polymers is selected from the group consisting of unsaturated thermoplastic elastomers, acrylate-insoluble saturated thermoplastic elastomers, and non-pressure sensitive adhesive thermoplastic polymers.

The PSA material may be prepared in various manners, such as by: (a) melt mixing a polymer composition and a plurality of microspheres, one or more of which is an expandable polymeric microsphere (as defined above), under process conditions, including temperature, pressure and shear rate, selected to form an expandable extrudable composition; (b) extruding the composition through a die to form a polymer foam (as defined above); and (c) at least partially expanding one or more expandable polymeric microspheres before the polymer composition exits the die. It may be desirable in certain embodiments for most, if not all, of the expandable microspheres to be at least partially expanded before the polymer composition exits the die. By causing expansion of the expandable polymeric microspheres before the composition exits the die, the resulting extruded foam can be produced to within tighter tolerances.

It may be desirable in certain embodiments for the PSA material to be substantially solvent-free. In one embodiment, the PSA material may contain less than 20 wt. % solvent, in a further embodiment, the material may contain substantially none to no greater than about 10 wt. % solvent and, and in yet a further embodiment, the material may contain no greater than about 5 wt. % solvent.

The PSA material of various embodiments may possess a weight average molecular weight of at least about 10,000 g/mol in one embodiment, and at least about 50,000 g/mol, in a further embodiment. The polymers used to fabricate the PSA material of various embodiments may exhibit shear viscosities measured at a temperature of 175° C. and a shear rate of 100 sec$^{-1}$, of at least about 30 Pascal-seconds (Pa-s), in one embodiment, at least about 100 Pa-s in a further embodiment, and at least about 200 Pa-s in yet a further embodiment.

The PSA foam material of various embodiments may also be crosslinked. For example, the foam may be exposed to thermal, actinic, or ionizing radiation or combinations thereof subsequent to extrusion to crosslink the foam. Crosslinking may also be accomplished by using chemical crosslinking methods based on ionic interactions.

The support backing utilized in embodiments of the present invention may be chosen from a variety of materials including plastically deformable polymeric materials including thermoplastic and thermoset materials. Being plastically deformable allows the support backing to be readily formable and to maintain its shape. In an embodiment, the plastically deformable support backing is a continuous sheet. In another embodiment, the plastically deformable support backing has an elongation at break of at least 50% according to ASTM D-412. In another embodiment, the plastically deformable support backing has an elongation at break of at least 100% according to ASTM D-412. In yet another embodiment, the plastically deformable support backing has an elongation at break of at least 200% according to ASTM D-412.

In particular, materials useful in automobile construction as body side molding and automotive cladding material may be used as the support backing. Examples include polypropylene, ethylene-propylene-diene rubbers (EPDM), thermoplastic urethanes (TPUs), reaction injection molded (RIM) urethane plastics and thermoplastic olefins (TPOs) which are copolymers of polypropylene, polyethylene, and rubber. In another embodiment, black automotive cladding, commercially available under the trade designation "Black TPO-TG Compound" from PolyOne Corporation, Cleveland, Ohio, may be used. The support backing may, optionally, comprise one or more top coats intended for other purposes, such as aesthetics, which have been shown to promote adhesion.

The adhesion promoters utilized in the present invention may be chosen from a variety of materials according to the type of damaged body panel and the repair laminate employed. Exemplary adhesion promoters include those for acrylic foam tapes, RIM and TPO, commercially available under the trade designations 3M Automix Polyolefin Adhesion Promoter, Part No. 5907 and 3M Automotive Adhesion Promoter Part number 06396 from 3M Company, St. Paul, Minn.

When using a solvent based adhesion promoter, such as the 5907 or 06396 adhesion promoters, the repair laminate is produced by applying the solvent to a side of the support backing, such as the smooth side of TPO. The side of the support backing with the solvent applied is then placed into contact with the PSA and pressure may be applied. The solvent is allowed to dry and the TPO is bonded to the PSA as a result.

When using an adhesion promoter other than one which is solvent based, then the adhesion promoter may be applied to the support backing such as the smooth side of TPO and pressure may be applied. The adhesion promoter may be applied as a polymerizable liquid and is cured by electron beam radiation, as described in U.S. Pat. No. 6,287,685 (Janssen et al.) and European Pat. No. 384,598 (Johnson et al.), the disclosures of each incorporated by reference herein. This radiation causes the two monomers of the adhesion promoter to polymerize, which grafts the adhesion promoter to the support backing.

To further illustrate the use of embodiments of the present invention, non-limiting examples of specific embodiments of the present invention provided solely for purposes of illustration are discussed below in conjunction with comparatives. Unless otherwise noted in the discussion of the examples and comparatives, all parts, percentages, and ratios reported are on a weight basis, and all reagents used in the examples and comparatives were obtained, or are available, from general chemical suppliers such as the Sigma-Aldrich Chemical Company, Saint Louis, Mo., or may be synthesized by conventional techniques.

The following abbreviations are used in the examples and comparatives:

"ADH1": a flexible urethane adhesive, commercially available under the trade designation "4125 Universal Adhesive" from 3M Company, St. Paul, Minn.;

"ADH2": a flexible urethane adhesive, commercially available under the trade designation "4240 Universal Adhesive" from 3M Company;

"ADPR1": a polyolefin adhesion promoter, commercially available under the trade designation "3M Automix Polyolefin Adhesion Promoter, Part No. 5907" from 3M Company;

"ADPR2": an adhesion promoter, commercially available under the trade designation "3M Automotive Adhesion Promoter Part number 06396" from 3M Company;

"FPR1": a 2-part epoxy, commercially available under the trade designation "3M Automix EZ Sand 5887 Flexible Plastic Repair" from 3M Company;

"SCRM1": a structural scrim with releasable film, commercially available under the trade designation "4904 Reinforcement Patch" from 3M Company;

"SCRM2": a fiberglass cloth, commercially available under the trade designation "3M Fiberglass Cloth, Part number 05838" from 3M Company;

"SCRM3": a fiberglass mat, commercially available under the trade designation "3M Fiberglass Mat, Part number 05837" from 3M Company;

"SCRM4": a strapping tape, commercially available under the trade designation "Scotch Filament Tape 898, Part number 06895" from 3M Company;

"SSLR1": a flexible urethane seam sealer, commercially available under the trade designation "4227 Seam Sealer" from 3M Company;

"TPO1": a 1 millimeter (mm) black thermoplastic polyolefin decorative automotive cladding commercially available under the from PolyOne Corporation, Cleveland, Ohio;

"TPO2": a 2 mm black thermoplastic polyolefin decorative automotive cladding commercially available under the from PolyOne Corporation, Cleveland, Ohio;

"VHB1": a 25-mil (0.64 mm) double-sided pressure sensitive adhesive acrylic foam tape, commercially available under the trade designation "4936 VHB Tape" from 3M Company;

"VHB2": a 15-mil (0.40 mm) double-sided pressure sensitive adhesive acrylic foam tape, commercially available under the trade designation "4926 VHB Tape" from 3M Company;

In order to standardize testing all of the following samples were held for 16 hours at 20° C. upon completion of the back side preparation. It will be appreciated that in actual use, the samples including the embodiments of the present invention would be held for only 20-30 minutes.

Comparative A

A 5.08 centimeters (cm) central hole was cut out of 10.2 by 10.2 by 0.32 cm panel of black thermoplastic polyolefin, obtained under the trade designation "BASF Hifax Black-Flexible TPO Exterior" from ACT laboratories, Hillsdale, Mich. The hole was then symmetrically beveled on both sides to an annular width of 0.48 cm. Both sides of the panel were roughened using a sandpaper, commercially available under the trade designation "Grade 80 Imperial Hookit II", obtained from 3M Company, on a dual action sander, model number "DAQ" from National Detroit, Inc., Rockford, Ill. ADPR1 was applied to one face (designated the back side) of the panel at 20° C. and allowed to dry for 5 minutes. Masking tape, commercially available under the trade designation "Scotch Automotive Refinish Masking Tape 233+, Part Number 26340", from 3M Company was applied to the front side of the panel. ADH1 was applied to the primed back side using a 3M Spreader, Part Number 05842. To complete the backside preparation a 10.2 by 10.2 cm sheet of SCRM1 was pressed into the adhesive, the supporting release film was removed, and the adhesive was allowed to cure for 15 minutes at 20° C. The masking tape was removed and the face side roughened in a similar fashion as for the back side, until a depression was formed below the flush line. ADPR1 was then applied to the face side of the panel and allowed to dry for 5 minutes at 20° C. The hole was then filled with FPR1 and allowed to partially cure for 15 minutes 20° C., after which the plastic repair material was then sanded flush with the panel using the dual action sander and "Grade 180 Imperial Hookit II", obtained from 3M Company. Another 4 test panels were prepared accordingly. For tensile strength tests, a 10.2 by 6.03 cm test section was cut from the plate, adjacent to the outer perimeter of the beveled edge.

Comparative B

Comparative B was prepared according to the method described in Comparative A, except SCRM1 was replaced with SCRM2

Comparative C

Comparative C was prepared according to the method described in Comparative B, except ADH1 was replaced with SSLR1, and SCRM2 was replaced with SCRM3.

Comparative D

Comparative D was prepared according to the method described in Comparative C, except SCRM3 was replaced by SCRM2.

Comparative E

Comparative E was prepared according to the method described in Comparative C, except SLR1 was replaced with FPR1.

Comparative F

Comparative F was prepared according to the method described in Comparative E, except SCRM3 was replaced with SCRM2.

Comparative G

Comparative G was prepared according to the method described in Comparative A, except ADH1 was replaced with ADH2.

Comparative H

Comparative H was prepared according to the method described in Comparative F, except SCRM2 was replaced with SCRM1.

Comparative I

Comparative I was prepared according to the method described in Comparative A, except SCRM1 was replaced with five layers SCRM4, and ADPR1 was replaced with ADPR2. The tensile strength test was performed in the machine direction of the filament tape.

Comparative J

Comparative J was prepared according to the method described in Comparative I, except The tensile strength test was performed in the cross-web direction of the filament tape.

Example 1

A 5.08 centimeters (cm) central hole was cut out of 10.2 by 10.2 by 0.32 cm panel of black thermoplastic polyolefin, obtained under the trade designation "BASF Hifax Black-Flexible TPO Exterior" from ACT laboratories, Hillsdale, Mich. The hole was then symmetrically beveled on both sides to an annular width of 0.48 cm. The face side of the panel was roughened using the dual action sander and "Grade 80 Imperial Hookit II" sandpaper. ADPR2 was applied to the smooth back side of the panel and allowed to dry for 5 minutes at 20° C. ADPR2 was applied to one side of a 22.9 by 27.9 cm sheet of TPO1 and allowed to dry for 5 minutes at 20° C. A 22.9 by 27.9 cm sheet of VHB1 was then laminated to the primed surface of the TPO1 using a hand roller and the resulting TPO-VHB laminate trimmed to 10.2 by 10.2 cm. To complete the back side preparation the foam tape face of the laminate manually pressed onto the primed surface of the panel. ADPR1 was applied to the face side of the panel and exposed face of the foam tape, allowed to dry for 5 minutes at 20° C., then filled with FPR1. After partially curing for 15 minutes at 20° C. the plastic repair material was then sanded flush with the panel using the dual action sander and "Grade 180 Imperial Hookit II" sandpaper.

Example 2

Example 2 was prepared according to the method described in Example 1, except VHB1 was replaced with VHB2, and TPO1 was replaced with TPO2.

While the backside laminates described in Examples 1 and 2 were individually prepared, it should be recognized that larger formats could be made, e.g., in roll form, including a release liner, and cut to the appropriate repair size as needed. Pre-made laminates would thus provide additional time savings for the repair shop.

Test Methods.

Sample Preparation Time. The time to complete the back side of the test panel was rated "Slower", "Same" or "Faster" relative to Comparative A.

Impact Resistance. Impact Resistance was determined at 20° C. using a model "43-02" impact tester, obtained from Testing Machines Inc., Amityville, N.Y. The test section was centrally placed, patch face out, against a 2.8 by 1.8 cm aluminum block. The hammer weight was 4.54 kilograms (Kg) and had an impact speed of 2.1 meters/second (m/s). Two test sections per sample were evaluated. If both test panels survived the impact test without breaking or exhibiting visible cracks, it was given a "pass" rating.

Tensile Strength. Tensile strength was determined according to ASTM D-638-91, using a model "QTest 100" machine from MTS Systems Corporation, Cary, N.C. Jaw spacing was 7.6 cm and a constant extension rate of 5.08 cm/minute at 20° C. Reported tensile strengths and percent elongations at break point are an average of three test sections per sample. A tensile strength greater than 500 pounds/inch² (psi) (3.45 MegaPascals (MPa)) is considered acceptable for automobile panel repairs.

Results of the testing including the speed of the repair as well as the resulting impact resistance and tensile strength of the automobile panel once repaired are listed in Table 1.

TABLE 1

| Sample | Speed of Repair | Impact Resistance | Tensile Strength psi (MPa) |
|---|---|---|---|
| BASF HiFax (without hole) | N/A | Passed | 1,655 (11.41) |
| BASF Hifax (with hole) | N/A | Passed | 1,380 (9.52) |
| Comparative A | Same | Passed | 688 (4.74) |
| Comparative B | Slower | Passes | 995 (6.86) |
| Comparative C | Slower | Passed | 910 (6.27) |
| Comparative D | Same | Passed | 1,165 (8.03) |
| Comparative E | Slower | Cracked | 935 (6.45) |
| Comparative F | Slower | Cracked | 260 (1.79) |
| Comparative G | Same | Broken | 235 (1.62) |
| Comparative I | Slower | Passed | 655 (4.52) |
| Comparative J | Slower | Cracked | 2,200 (15.17) |
| Comparative H | Slower | Broken | 163 (1.12) |
| Example 1 | Faster | Passed | 590 (4.07) |
| Example 2 | Faster | Passed | 625 (4.31) |

It can be seen that using the embodiments of the present invention resulted in a speed of repair that was faster that most of the comparatives while also passing the impact resistance test and giving a tensile strength that is desirable for automobile panel repairs.

What is claimed is:

1. A method of repairing a thermoplastic polyolefin automobile panel having a front side, a back side, and a damaged area, comprising:
    applying a repair laminate to the backside of the thermoplastic polyolefin automobile panel at the damaged area to reinforce the damaged area, the repair laminate comprising a pressure sensitive adhesive bonded to a support backing comprising a continuous sheet of thermoplastic polyolefin having a thickness of at least 0.75 millimeters, the repair laminate being applied by bonding the pressure sensitive adhesive to the back side of the damaged area; and
    after applying the repair laminate, cosmetically repairing the front side of the damaged area.

2. The method of claim 1, wherein the pressure sensitive adhesive comprises a foam.

3. The method of claim 1, wherein the pressure sensitive adhesive is bonded to the support backing with an adhesion promoter.

4. The method of claim 1, wherein the pressure sensitive adhesive has a thickness less than that of the support backing.

5. The method of claim 1, wherein applying the repair laminate to the back side comprises applying an adhesion promoter to the back side and then applying the pressure sensitive adhesive to the back side where the adhesion promoter has been applied.

* * * * *